United States Patent [19]

Shimohira et al.

[11] Patent Number: 5,149,403
[45] Date of Patent: Sep. 22, 1992

[54] FLUORINE-CONTAINING CATION EXCHANGE MEMBRANE FOR ELECTROLYSIS AND PROCESS FOR PRODUCING ALKALI METAL HYDROXIDE BY USING THE SAME

[75] Inventors: Tetsuji Shimohira; Yoshiaki Higuchi; Yoshihiko Saito; Kohji Suzuki, all of Yokohama, Japan

[73] Assignee: Asahi Glass Company Ltd., Tokyo, Japan

[21] Appl. No.: 629,643

[22] Filed: Dec. 7, 1990

[30] Foreign Application Priority Data

Sep. 27, 1990 [JP] Japan .................. 2-255302

[51] Int. Cl.$^5$ .................. C25B 1/16; C25B 13/08
[52] U.S. Cl. .................. 204/98; 204/252; 204/296; 521/27
[58] Field of Search .................. 204/98, 128, 252, 296, 204/298; 521/27

[56] References Cited

U.S. PATENT DOCUMENTS 4,900,408  2/1990  Powers .................. 204/296

FOREIGN PATENT DOCUMENTS 94587  11/1983  European Pat. Off. .

Primary Examiner—John Niebling
Assistant Examiner—Kathnjn Gorgos
Attorney, Agent, or Firm—Oblon, Spivak, McClelland, Maier & Neustadt

[57] ABSTRACT

A fluorine-containing cation exchange membrane for electrolysis, which comprises a multi-layered structure prepared by integrally laminating (i) the first ion exchange layer having —COOM groups (M is hydrogen or an alkali metal) in an ion exchange capacity of from 0.6 to 2.0 meq/g dry resin and having a thickness of from 5 to 300 μm, (ii) the second ion exchange layer present on the anode side of the first ion exchange layer, the second ion exchange layer having a smaller specific resistance and a larger thickness than the first ion exchange layer, and (iii) a hydrophilic asymmetric porous layer present on the cathode side of the first ion exchange layer, the porous layer having a water-permeability which becomes smaller in proportion as closer to the cathode side, and a process for producing an alkali metal hydroxide by using the above fluorine-containing cation exchange membrane.

9 Claims, No Drawings

FLUORINE-CONTAINING CATION EXCHANGE MEMBRANE FOR ELECTROLYSIS AND PROCESS FOR PRODUCING ALKALI METAL HYDROXIDE BY USING THE SAME

BACKGROUND OF THE INVENTION

The present invention relates to a fluorine-containing cation exchange membrane for electrolysis and a process for producing alkali metal hydroxide by using the same.

In recent years, alkali electrolysis by an ion exchange membrane method to produce an alkali metal hydroxide and chlorine by electrolyzing an alkali metal chloride aqueous solution by means of a fluorine-containing resin ion exchange membrane as a membrane for electrolysis, has been internationally spread since it enables the production of an alkali metal hydroxide of a high purity at a low energy consumption in comparison with a conventional method.

In the early stage of such alkali electrolysis by the ion exchange membrane method, a fluorine-containing ion exchange membrane having sulfonic acid groups as ion exchange groups was used, but the ion exchange membrane has been recently replaced by a cation exchange membrane having carboxylic acid groups as ion exchange groups since the former ion exchange membrane could not raise an electric current efficiency. As this result, the electric current efficiency of electrolysis has reached about 93 to 97% which is almost completely satisfactory for industrial use.

However, although the above mentioned carboxylic cation exchange membrane achieves an excellent electric current efficiency for a long term, it has been found that it is suitable only for producing an alkali metal hydroxide of a concentration of up to about 35% by weight. According to the research of the present inventors, when the concentration of an alkali metal hydroxide to be produced has exceeded about 35% by weight, there has been a phenomenon that the electric current efficiency has been gradually lowered during a long operation term of from one month to one year although the current efficiency has been high at the initial stage of operation. Thus, the carboxylic cation exchange membrane is not always suitable for industrially producing an alkali metal hydroxide of such a high concentration.

On the other hand, there has been proposed a process for producing an alkali metal hydroxide of a concentration of at least 30% by weight by using a sulfonic cation exchange membrane of a fluorine-containing resin, but the electric current efficiency by this process is also lowered when the operation is continued for a long term. That is, the electric current efficiency at the initial stage is from 91 to 93%, but it is lowered to from 87 to 90%.

Furthermore, U.S. Pat. No. 4,455,210 discloses a process for producing an alkali metal hydroxide of a high concentration by using a cation exchange membrane comprising a fluorine-containing polymer film having sulfonamide acid groups, the cathode side of which is laminated with a fluorine-containing polymer film having sulfonic acid groups. However, this process has disadvantages not only that the electric current efficiency at the initial stage is low but also that the electric current efficiency is further lowered since the sulfonic acid group layer on the cathode side is peeled when the operation is conducted for a long term. Furthermore, Japanese Unexamined Patent Publication No. 105598/1977 discloses a process for producing an alkali metal hydroxide by using an ion exchange membrane comprising a fluorine-containing polymer having sulfonic acid groups, at the cathode side of which a porous membrane of a fluorine-containing polymer having sulfonic acid groups is disposed. In this case, since a three compartment type electrolysis system having two membranes is employed, the electrolysis voltage is high, and it is necessary for obtaining a high electric current efficiency to supply a dilute alkali solution to the intermediate compartment by pressure, thus the electrolysis operation being very complicated.

Still further, in the case of the conventional electrolysis by an ion exchange membrane method, an allowable amount of a heavy metal ion such as calcium in an alkali metal chloride aqueous solution starting material must be restricted to at most 0.05 ppm, particularly to at most 0.01 ppm, thereby the manufacturing cost being very high.

SUMMARY OF THE INVENTION

The present invention aims at providing an ion exchange membrane which enables electrolysis of an alkali metal hydroxide in a wide range of concentrations while keeping a high electric current efficiency not only in the initial stage but also during the long term operation and which enables to enlarge an allowable amount of a heavy metal ion such as calcium in an alkali metal chloride aqueous solution starting material, and also providing a process for producing an alkali metal hydroxide by using said membrane.

Particularly, the present invention aims at providing a process for producing an alkali metal hydroxide of a high concentration without using a concentration process of an electrolyte solution by an evaporator, thereby enabling the production of an alkali metal hydroxide of a concentration of at least 42% by weight, which is considered to be difficult by a conventional technique.

Thus, the present invention has its gist in providing a fluorine-containing cation exchange membrane for producing an alkali metal hydroxide by an ion exchange membrane method, which comprises a multi-layered structure prepared by integrally laminating (i) the first ion exchange layer having a —COOM group (M is hydrogen or an alkali metal) in an ion exchange capacity of from 0.6 to 2.0 meq/g dry resin and having a thickness of from 5 to 300 μm, (ii) the second ion exchange layer present on the anode side of the first ion exchange layer, the second ion exchange layer having a smaller specific resistance and a larger thickness than the first ion exchange layer, and (iii) a hydrophilic asymmetric porous layer present on the cathode side of the first ion exchange layer, the porous layer having a water-permeability which becomes smaller in proportion as closer to the cathode side, and also providing a process for producing an alkali metal hydroxide by using the above fluorine-containing cation exchange membrane.

The above mentioned fluorine-containing resin cation exchange membrane of the present invention which comprises the multi-layer structure comprising the first and the second ion exchange layers and the asymmetric porous layer having the specific physical properties, enables the production of an alkali metal hydroxide of a wide range of concentration, particularly of a high concentration of at least 42% by weight, by stable electrolysis at a high electric current efficiency and at a low electric voltage for a long term. This object can not be achieved if any of the above layers is omitted. The first and the second ion exchange layers are effective for enabling the electrolysis at a high current efficiency and at a low voltage, but the current efficiency is lowered as a lapse of time and the long term stable electrolysis can not be conducted if the asymmetric porous layer is omitted.

It is necessary that the first ion exchange layer comprises a fluorine-containing polymer having the above mentioned —COOM groups in an ion exchange capacity of from 0.6 to 2.0 meq/g dry resin and has a thickness of from 5 to 300 μm. Particularly, in the present invention, the smaller the equivalent amount is, the more stably the operation can be made for a long term. Also, the smaller the thickness is, the smaller the membrane resistance is. Thus, a preferable ion exchange capacity is from 0.7 to 1.5 meq/g dry resin, and a preferable thickness is from 10 to 60 μm.

On the anode side of the first ion exchange layer, the second ion exchange layer having a smaller specific resistance and a larger thickness in comparison with the first ion exchange layer is present. The specific resistance of the second ion exchange layer is preferably from 10 to 500 Ω·cm, more preferably from 20 to 200 Ω·cm at 25° C. in a 12 wt % NaOH aqueous solution, and is preferably from 30 to 80% smaller than that of the first ion exchange layer. The thickness of the second ion exchange layer is preferably from 10 to 300 μm, more preferably from 50 to 200 μm, and is preferably from 150 to 1,000% larger than that of the first ion exchange layer.

As the second ion exchange layer, a mono- or multilayer of a fluorine-containing polymer having —$SO_3M$ groups and/or —COOM groups is used. In order to impart a large strength, a fabric made of anti-corrosive fluorine-containing polymer such as polytetrafluoroethylene may be inserted into the second ion exchange layer as a reinforcing material.

The fluorine-containing polymer having —$SO_3M$ groups and/or —COOM groups used for forming the first and the second ion exchange layers, preferably comprises a copolymer having the following polymerization units (a) and (b):

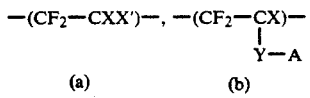

wherein X and X' are —F, —Cl, —H or —$CF_3$; A is —$SO_3M$ or —$CO_2M$ (M is hydrogen, an alkali metal or a hydrolyzable group which can be converted into such a group); and Y is selected from the following group:

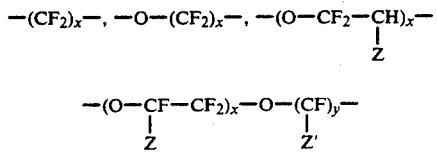

(wherein Z and Z' are —F or a perfluoroalkyl group having a carbon number of 1 to 10, and $x$ and $y$ are an integer of 1 to 10).

In addition to the polymerization units (a) and (b), the above copolymer may further contain the following polymerization units:

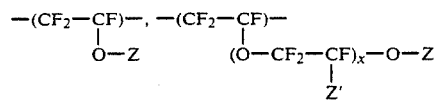

(wherein Z, Z' and x are as defined above).

The composition ratio (molar ratio) of the polymerization units (a)/(b) used for forming the above polymer is selected so that the fluorine-containing polymer may have the above mentioned ion exchange capacity.

The fluorine-containing polymer is preferably a perfluorocarbon polymer, suitable examples of which include a copolymer of $CF_2=CF_2$ and $CF_2=CFOCF_2CF(CF_3)OCF_2CF_2SO_2F$, a copolymer of $CF_2=CF_2$ and $CF_2=CFO(CF_2)_{2-5}SO_2F$, a copolymer of $CF_2=CF_2$ and $CF_2=CFO(CF_2)_{1-5}COOCH_3$, a copolymer of $CF_2=CF_2$ and $CF_2=CF(CF_2)_{2-5}CO_2CH_3$ and a copolymer of $CF_2=CF_2$ and $CF_2=CFOCF_2CF(CF_3)O(CF_2)_{2-5}COOCH_3$.

On the other hand, on the cathode side of the above mentioned first ion exchange layer, a hydrophilic asymmetric porous layer having a water-permeability which becomes gradually smaller towards the cathode. Although the mechanism is not clear, if the porous layer present on the cathode side of the first ion exchange layer does not have the asymmetric structure, e.g. if the porous layer always has a constant and uniform water-permeability throughout the layer, it is difficult, regardless of the water-permeability being large or small, to attain a high current efficiency and a low cell voltage and to protect the porous layer from being peeled off from the ion exchange layer.

The hydrophilic asymmetric porous layer has such a structure that the water-permeability may become continuously or discontinuously smaller towards the cathode, and can be composed of a single layer or plural layers. In any case, the asymmetric porous layer comprises inorganic particles and a fluorine-containing copolymer having hydrophilic groups. It is difficult to form the asymmetric porous layer having the controlled water-permeability by using inorganic particles only. On the other hand, the asymmetric porous layer comprising a fluorine-containing copolymer having hydrophilic groups only, does not strongly bond with the ion exchange layer, and tends to be peeled off during a long term operation. As the fluorine-containing copolymer having hydrophilic groups, a fluorine-containing polymer having —$SO_3M$ (M is as defined above) or —COOM groups in an equivalent amount of from 0.5 to 2.0 meq/g dry resin, preferably from 0.7 to 1.8 meq/g resin, is preferable. As the hydrophilic group, an —$SO_3M$ group is advantageous since it is durable particularly when producing an alkali metal hydroxide having a high concentration of at least 42% by weight.

The water-permeability of the asymmetric porous layer is preferably from $5 \times 10^{-4}$ to $5 \times 10^2$ cc/hr·cm²·atom, more preferably from $1 \times 10^{-3}$ to $1 \times 10^2$ cc/hr·cm²·atom, and is made continuously or discontinuously smaller towards the cathode. When the water-permeability is made continuously smaller, it may not always be made smaller at a constant rate, but it may have only to be made averagely smaller in total aspect. The water-permeability is controlled generally by a porosity, and the porosity is selected from the range of from 10 to 95%. The thickness of the asymmetric porous layer is preferably from 5 to 300 μm, more preferably from 10 to 150 μm, and the membrane resistance does not become so large since this layer is inherently porous.

The asymmetric porous layer comprising the above mentioned inorganic particles and fluorine-containing polymer having a hydrophilic group can be prepared by various processes. It is not necessary that all the parts of the asymmetric porous layer should contain the inorganic particles and the fluorine-containing polymer having a hydrophilic group, but in some parts, one of the two components may be present. Examples of the process for preparing the asymmetric porous layer include a process which comprises mixing inorganic particles with a fluorine-containing polymer having hydrophilic groups, kneading the mixture, heat-molding the kneaded mixture into a thin film and stretching the thin film into a porous film, and a process which comprises forming two porous layers of inorganic particles by means of a suitable water-soluble binder such as methyl cellulose, placing a film of fluorine-containing polymer having hydrophilic groups between the two porous layers and press-bonding them in the presence of heat under pressure. Preferable examples of the inorganic particles used in the present invention include boron carbide, oxides, nitrides, carbides or hydroxides of the third period et sequence elements of IIa, IIIb, IVb, Vb, IIIa and IVa Groups of the long form of the periodic table. These compounds may be used alone or in combination. More preferable examples include oxides, nitrides, carbides and hydroxides of titanium, zirconium, niobium, hafnium, tantalum, indium, tin or the like, oxide and carbide of slicon and their mixtures. In this case, the porosity and water-permeability of a porous layer obtained can be varied by controlling particle sizes and amounts of inorganic particles used.

Another process for preparing an asymmetric porous layer comprises kneading a decomposable or extractable pore-forming agent with a fluorine-containing polymer having a hydrophilic group, forming the kneaded mixture into a thin film, and decomposing or extracting the pore-forming agent to prepare a porous film. Examples of the pore-forming agent include $SiO_2$, polycarbonate, cotton, rayon, nylon, polyethylene terephthalate, polyacrylonitrile or the like, which can be dissolved during hydrolysis with an alkali aqueous solution, and ethyl cellulose, alkyl naphthalene, water-soluble salts such as sodium chloride or the like, which can be extracted with a solvent. The porosity and the water-permeability of the asymmetric porous layer can be controlled by appropriately selecting the amount and the particle size of the pore-forming agent.

A preferable embodiment of the asymmetric porous layer for the fluorine-containing cation exchange membrane of the present invention, comprises two porous layers on the anode side and the cathode side. In this case, the anode side porous layer in contact with the ion exchange layer should preferably have a porosity of from 5 to 95% and a water-permeability of from $1 \times 10^{-2}$ to $5 \times 10^2$ cc/hr·cm²·atom. If the porosity is less than 5%, a high current efficiency can not be achieved and electrolysis voltage becomes high, and the asymmetric porous layer tends to be peeled off from the ion exchange layer depending on electrolyzing conditions. Thus, an asymmetric porous layer having a porosity of from 10 to 85% is more preferable. On the other hand, if the water-permeability is less than $1 \times 10^{-2}$ cc/hr·cm²·atom, the electrolysis voltage becomes high and the asymmetric porous layer tends to be peeled off from the ion exchange layer depending on electrolyzing conditions. Thus, an asymmetric porous layer having a water-permeability of from $1 \times 10^{-1}$ to $1 \times 10^2$ hr·cm²·atom is more preferable.

Since the water-permeability of the anode side porous layer is larger than that of the cathode side porous layer and electric current passes through the pores, the anode side porous layer may comprise inorganic particles only and may not contain a fluorine-containing polymer having hydrophilic groups. When the anode side porous layer does not contain the fluorine-containing polymer, an alkali-resistant porous material such as an asbestos film impregnated with fluorine resin or the like may be used. The thickness of the anode side porous layer should preferably be not preferably more than 200 μm in order to reduce a membrane resistance, and is more preferably from 20 to 100 μm.

The cathode side porous layer of the asymmetric porous layer has a porosity of not more than 80%, preferably not more than 60%, and a water-permeability of from $1 \times 10^{-3}$ to 5 cc/hr·cm²·atom, preferably $5 \times 10^{-3}$ to 2 cc/hr·cm²·atom. Since the water-permeability of the cathode side porous layer is smaller than that of the anode side porous layer, it should preferably contain a fluorine-containing ion exchange polymer having hydrophilic groups such as $SO_3M$ or $COOM$ groups in order to form electric current passing parts other than the pore parts in the porous layer.

If the cathode side porous layer has a porosity of higher than 80% and a water-permeability of higher than 5 cc/hr·cm²·atom, a high current efficiency can not be achieved. On the other hand, if the water-permeability is lower than $1 \times 10^{-3}$ cc/hr·cm²·atom, the current efficiency becomes low and the porous layer tends to be peeled off depending on electrolyzing conditions. The water-permeability of the cathode side porous layer should be preferably less than 1/5, more preferably less than 1/30 in comparison with that of the anode porous layer.

The cathode side porous layer can be prepared in the same manner as the above mentioned anode side porous layer, but the cathode side porous layer contains at least 30% by volume, preferably at least 50% by volume of a fluorine-containing polymer when it is composed of a fluorine-containing polymer and inorganic particles. If the content of the fluorine-containing polymer is less than 30% by volume, a high current efficiency can not be achieved stably even if the porosity and the water-permeability are within the above mentioned ranges. The thickness of the cathode side porous layer should be not more than 100 μm, preferably from 10 to 50 μm in order to reduce a membrane resistance.

The first ion exchange layer, the second ion exchange layer and the asymmetric porous layer prepared as mentioned above, are integrally laminated by placing the first ion exchange layer between the second ion exchange layer and the asymmetric porous layer and heat press-bonding them preferably at a temperature of from 100° to 250° C. and under a pressure of from 5 to 100 atoms, thus producing a fluorine-containing cation exchange membrane. The cation exchange membrane thus produced has the total thickness of preferably from 50 to 400 μm, more preferably from 100 to 300 μm.

The above produced fluorine-containing cation exchange membrane can be used as it is, but it is preferable to apply a gas-releasing treatment to at least one surface of the ion exchange membrane, particularly a chlorine gas-releasing treatment to the anode side surface of the ion exchange membrane, in order to improve a long term stability of a current efficiency and a cell voltage.

Examples of the process for applying gas-releasing treatment to the surface of the ion exchange membrane include a process for forming minute concave-convex patterns on the surface of the membrane (see U.S. Pat. No. 4,468,301), a process for depositing hydrophilic inorganic particles to the surface of the membrane by supplying a disposing containing iron, zirconia or the like to an anolyte in an electrolytic cell (see U.S. Pat. No. 4,367,126), and a process for providing a non-electrode porous layer on at least one surface of the membrane (see U.S. Pat. Nos. 4,666,574 and 4,652,356). The gas-releasing layer on the surface of the ion exchange membrane improves not only the long term stability of current efficiency but also the stability of voltage during electrolysis.

The known conditions as disclosed in the above mentioned Japanese Unexamined Patent Publication No. 112398/1979 may be employed for the present process conditions of electrolyzing an alkali metal chloride aqueous solution by using the fluorine-containing cation exchange membrane of the present invention. For example, from 2.5 to 5.0 N alkali metal chloride aqueous solution is supplied to the anode compartment, and electrolysis is conducted preferably under the conditions of from 50° to 120° C. and from 5 to 100 A/dm$^2$, optionally by supplying water or dilute alkali metal hydroxide to the cathode chamber. In this case, it is preferable to reduce heavy metal ions such as calcium and magnesium, and iodine ions as much as possible in the alkali metal chloride aqueous solution since these impurities deteriorate the ion exchange membrane. However, when using the cation exchange membrane of the present invention, an allowable amount of these impurities can be allowed, for example from 5 to 20 times larger than in a conventional case, although it varies depending on the concentration of an alkali metal hydroxide to be produced. Furthermore, in order to prevent the generation of oxygen at the anode, an acid such as hydrochloric acid may be added to the alkali chloride aqueous solution.

An electrolytic cell used in the present invention may be either mono-polar type or bi-polar type so far as the ion exchange membrane has the above mentioned structure. In the case of electrolysis of an alkali metal chloride aqueous solution, examples of the material for composing an electrolytic cell include valve metal, titanium or the like for the anode compartment, which are resistant to the alkali metal chloride aqueous solution and chlorine, and iron, stainless steel or nickel for the cathode compartment, which is resistant to the alkali metal hydroxide and hydrogen. According to the present invention, when an electrode is placed, the electrode may be placed in contact with the multi-layer membrane or may be placed apart from the membrane. However, in the present invention, even when the electrode is placed in contact with the membrane, an advantageous cell voltage can be achieved with a low membrane resistance without any hindrance.

As mentioned above, the cation exchange membrane of the present invention, which has a multi-layer structure comprising the first and the second ion exchange layers and the specific asymmetric porous layer, enables the electrolysis for producing an alkali metal hydroxide having a particularly high concentration for a long time without causing the peeling off between layers while maintaining a satisfactory current efficiency and electrolysis voltage, and largely allows an amount of impurities including a heavy metal ion such as calcium in the starting alkali metal chloride aqueous solution.

In the following, the present invention will be explained more concretely with reference to practical examples, although the present invention should not be restricted by these examples. In the following Examples and Comparative Examples, electrolysis was carried out by using an electrolytic cell having an effective electric current-applied area of 0.25 dm$^2$, which contained an anode comprising a punched metal of titanium having diamond-shaped openings (short diameter=4 mm, long diameter=8 mm) coated with the solid solution of ruthenium oxide-iridium oxide-titanium oxide and a cathode comprising a punched metal of SUS 304 having diamond-shaped openings (short diameter=4 mm, long diameter=8 mm) etching-treated in a sodium hydroxide aqueous solution (52% by weight) at 150° C. for 52 hours. The electrolysis was carried out by placing the anode, the membrane and the cathode in contact with one another, supplying a 5 N sodium chloride aqueous solution to the anode compartment and water to the cathode compartment, and keeping the concentration of the sodium chloride in the anode compartment to 3.5 N and the concentration of the sodium hydroxide in the cathode compartment to from 20 to 50% by weight, at 90° C. and at an electric current density of 30 A/dm$^2$.

Example 1

A laminated membrane as an ion exchange layer was prepared by heat press-bonding a film (i) of 20 µm thickness comprising $CF_2=CF_2/CF_2=CFOCF_2CF_2CF_2CO_2CH_3$ copolymer having an ion exchange capacity of 1.25 meq/g dry resin with a film (ii) of 140 µm thickness comprising $CF_2=CF_2/CF_2=CFOCF_2CF_2CF_2CO_2CH_3$ copolymer having an ion exchange capacity of 1.44 meq/g dry resin.

On the other hand, a porous layer was prepared by kneading a mixture of methyl cellulose containing 30% by weight of $ZrO_2$ having a particle size of 5 µm, water, cyclohexanol and cyclohexane to form a paste, coating and drying the paste on a MYLAR film (a registered trademark of E. I. Dupont for polyethyleneterephthalate) to form a porous layer having $ZrO_2$ particles adhered in an amount of 4 mg per cm$^2$ of the film face. A film of 20 µm thickness comprising a $CF_2=CF_2/CF_2=CFOCF_2CF(CF_3)OCF_2CF_2SO_2F$ copolymer having an ion exchange capacity of 1.1 meq/g dry resin was inserted between the above prepared two porous layers, and the sandwiched structure was heat press-bonded by applying pressure on both sides and transferring the porous layers from the MYLAR film, thus producing an anode side porous layer A.

Also, a precursor of a cathode side porous layer B was prepared by kneading 35% by volume of polyethylene terephthalate with a $CF_2=CF_2/CF_2=CFOCF_2CF(CF_3)OCF_2CF_2SO_2F$ copolymer having an ion exchange capacity of 1.1 meq/g dry resin, processing the kneaded mixture into a thin film of 20 µm thickness and eluting the polyethylene terephthalate to form a porous layer.

The above prepared porous layer A was firstly laminated on the above prepared ion exchange layer (i) having the ion exchange capacity of 1.25 meq/g dry resin of the laminated membrane used as the above ion exchange layer, and the above prepared porous layer B was further laminated thereon. The laminated product thus prepared was subjected to hydrolysis with 25% by weight of NaOH at 70° C. for 16 hours.

Each of the above prepared porous layers A and B was separately subjected to hydrolysis to measure its porosity and water-permeability, and it was found that the porous layer A had a porosity of 24% and a water-permeability of 20 cc/hr·cm²·atom and that the porous layer B had a porosity of 35% and a water-permeability of 0.2 cc/hr·cm²·atom.

The fluorine-ion exchange membrane thus obtained was placed in an electrolytic cell so that the porous layers A and B might face towards the cathode side, and electrolysis of a sodium chloride aqueous solution containing 0.02 ppm of Ca ion was carried out.

As the result of this electrolysis, the voltages was 3.68 V and the current efficiency was 95.5% when the sodium hydroxide aqueous solution obtained from the cathode compartment had a concentration of 49% by weight.

Example 2

A fluorine-containing ion exchange membrane was prepared in the same manner as in Example 1, except that both sides of the fluorine-containing ion exchange membrane of Example 1 were further heat press-bonded with a porous layer prepared in the same manner as in the preparation of the porous layer A of Example 1, but having $ZrO_2$ particles adhered in an amount of 1 mg per $cm^2$ of the film face as a gas-releasing layer.

The fluorine-containing ion exchange membrane thus obtained was used to electrolyze a sodium chloride aqueous solution in the same manner as in Example 1. The results are shown in Table 1.

TABLE 1

| Operation days | Cathode compartment sodium hydroxide concentration (wt %) | Electric voltage (V) | Electric current efficiency (%) |
| --- | --- | --- | --- |
| 1–30 | 49 | 3.27 | 95.5 |
| 30–40 | 40 | 3.16 | 95.7 |
| 40–50 | 30 | 3.03 | 95.5 |
| 50–60 | 25 | 2.96 | 95.2 |
| 60–100 | 35 | 3.09 | 95.8 |
| 100–180 | 49 | 3.27 | 95.5 |
| 180–200 | 52 | 3.31 | 95.6 |

Comparative Example 1

A comparative fluorine-containing ion exchange membrane was prepared in the same manner as in Example 2, except that the porous layer B was omitted, and electrolysis was carried out by using the comparative membrane thus obtained. The results are shown in Table 2.

TABLE 2

| Operation days | Cathode compartment sodium hydroxide concentration (wt %) | Electric voltage (V) | Electric current efficiency (%) |
| --- | --- | --- | --- |
| 1–5 | 35 | 3.02 | 94.7 |
| 5–10 | 43 | 3.11 | 93.0 |
| 15–20 | 49 | 3.18 | 91.5 |
| 20–25 | 35 | 3.04 | 92.8 |
| 25–40 | 49 | 3.20 | 90.2 |
| 40–60 | 49 | 3.24 | 88.5 |

Comparative Example 2

A comparative fluorine-containing ion exchange membrane was prepared in the same manner as in Example 2, except that the porous layer A laminated on the ion exchange layer having the ion exchange capacity of 1.25 meq/g dry resin was replaced by the porous layer B. Electrolysis was carried out by using the Comparative membrane thus obtained in such a manner that a concentration of sodium hydroxide in the cathode compartment might become 49% by weight, and as the result, the porous layer B was peeled off from the ion exchange layer. The current efficiency was low, i.e. 90.8%, and the voltage was high, i.e. 3.46 V.

Comparative Example 3

A comparative fluorine-containing ion exchange membrane was prepared in the same manner as in Example 2, except that the porous layer B was replaced by a porous layer prepared by using polyethylene terephthalate in an amount of 25% by weight so that its water-permeability might become $8 \times 10^{-4}$ cc/hr·cm²·atom. Electrolysis was carried out by using the Comparative membrane thus obtained so as to adjust the sodium hydroxide concentration in the cathode compartment to 49% by weight, and as the result, the porous layer A was peeled off from the ion exchange layer. The voltage was high, i.e. 3.57 V, and the current efficiency was low, i.e. 89.5%.

Example 3

A mixture of fine powder of polytetrafluoroethylene (hereinafter referred to as PTFE) and illuminating kerosine (as a liquid lubricant) was formed into a film. After removing the illuminating kerosine, the film was stretched towards two directions at a right angle, and was heat treated to obtain a stable PTFE porous film having a pore size of 2 μm, a porosity of 70% and a thickness of 120 μm.

A three-layered membrane having a thickness of 170 μm was then prepared by heat-pressing the above prepared PTFE porous film/$CF_2$=$CF_2$/$CF_2$=$CFOCF_2CF_2CF_2CO_2CH_3$ copolymer film (ion exchange capacity=1.44 meq/g dry resin, thickness=20 μm)/$CF_2$=$CF_2$/$CF_2$=$CFOCF_2CF_2CF_2CO_2CH_3$ copolymer film (ion exchange capacity=1.25 meq/g dry resin, thickness=40 μm).

On the side of the ion exchange layer having the ion exchange capacity of 1.25 meq/g dry resin of the above prepared three-layered membrane, there was laminated firstly the porous layer A as used in Example 1 and secondary a precursor of a porous layer B prepared by kneading $SiO_2$ particles having a particle size of 2 μm with a $CF_2$=$CF_2$/$CF_2$=$CFOCF_2CF(CF_3)OCF_2CF$-

$_2SO_2F$ copolymer having an ion exchange capacity of 1.1 meq/g dry atom (Copolymer A) in an amount of 50% by volume, forming the kneaded mixture into a thin film of 15 μm thickness, and eluting $SiO_2$ out.

Thereafter, 4 parts of the above mentioned Copolymer A and 8 parts of zirconyl chloride were dissolved in a mixed solvent of 57 parts of methanol and 31 parts of water to obtain a mixture liquor. Immediately after impregnating the porous layer of the above prepared laminated membrane with the mixture liquor thus obtained, the impregnated laminated membrane was dipped in a surfactant solution comprising 1 part of sodium oleate, 65 parts of ethanol and 35 parts of water, to fix the copolymer and the inorganic compound by coagulation.

Moreover, a dispersion was prepared by dispersing 13% of $ZrO_2$ particles of an average particle size of 5 μm in a 2.5% by weight of ethanol solution of an acid type polymer of Copolymer A, and the dispersion thus prepared was sprayed on both sides of the above prepared laminated membrane so as to have a coating comprising the Copolymer A and the $ZrO_2$ particles adhered in an amount of 0.9 mg per $cm^2$. The multi-layered membrane thus obtained was subjected to hydrolysis in 25% by weight of NaOH at 70° C. for 16 hours, and electrolysis was carried out by placing the membrane in such manner as to have the PTFE porous layer faced to the anode side. As a result, sodium hydroxide having a concentration of 49% by weight was obtained at a current efficiency of 95.2% and a voltage of 3.15 V, and the current efficiency and the voltage were not varied during the continuous electrolysis for 130 days.

The above used porous layer B was separately subjected to hydrolysis to measure its porosity and water-permeability, and it was found that the porosity was 50% and that the water-permeability was 0.2 cc/hr·$cm^2$·atom.

Example 4

A multi-layered ion exchange membrane was prepared in the same manner as in Example 2, except that the porous layer A was replaced by a porous layer having a porosity of 35%, a water-permeability of 190 cc/hr·$cm^2$·atom and a thickness of 40 μm, prepared by adhering an emulsion of tetrafluoroethylene and hexafluoropropylene copolymer onto asbestos and firing the resultant film. Electrolysis was carried out by using the above prepared multi-layered ion exchange membrane, and as a result, sodium hydroxide having a concentration of 49% by weight was obtained at a current efficiency of 95.6% and a voltage of 3.29 V. The current efficiency and the voltage were not varied during continuously electrolyzing for 130 days.

Comparative Example 4

A comparative multi-layered ion exchange membrane was prepared in the same manner as in Example 4, except that the porous layer B was omitted. Electrolysis was carried out by using the above prepared comparative membrane, and as this result, sodium hydroxide having a concentration of 49% by weight was obtained in the cathode compartment at a current efficiency of 81% and a voltage of 3.18 V.

Example 5

A multi-layered ion exchange membrane was prepared in the same manner as in Example 2, except that the porous layer B was replaced by a porous layer prepared by heat press-bonding a $ZrO_2$ porous layer as used in Example 1 but having $ZrO_2$ particles adhered in an amount of 2 mg/$cm^2$ with a $CF_2=CF_2/CF_2=CFOCF_2CF(CF_3)OCF_2CF_2SO_2F$ copolymer film having a thickness of 10 μm and an ion exchange capacity of 1.0 meq/g dry resin. Electrolysis was carried out by using the above prepared multi-layered ion exchange membrane, and the results are shown in Table 3.

TABLE 3

| Operation days | Cathode compartment sodium hydroxide concentration (wt %) | Electric voltage (V) | Electric current efficiency (%) |
|---|---|---|---|
| 1–30 | 49 | 3.31 | 95.2 |
| 30–60 | 49 | 3.31 | 95.6 |
| 60–80 | 35 | 3.12 | 95.4 |
| 80–100 | 30 | 3.07 | 95.3 |
| 100–150 | 49 | 3.31 | 95.5 |
| 150–180 | 52 | 3.34 | 95.4 |
| 180–250 | 49 | 3.30 | 95.3 |

The above used porous layer B was separately subjected to hydrolysis to measure a porosity and a water-permeability, and it was found that the porosity was 12% and that the water-permeability was 0.4 cc/hr·$cm^2$·atom.

Comparative Example 5

A comparative multi-layered ion exchange membrane was prepared in the same manner as in Example 5, except that the porous layer B was prepared by using the same type of fluorine-containing ion exchange polymer film having a thickness of 5 μm in place of the fluorine-containing ion exchange polymer film having the thickness of 10 μm. Electrolysis was carried out by using the above prepared comparative membrane, and the results are shown in Table 4.

TABLE 4

| Operation days | Cathode compartment sodium hydroxide concentration (wt %) | Electric voltage (V) | Electric current efficiency (%) |
|---|---|---|---|
| 1–10 | 49 | 3.29 | 93.0 |
| 10–20 | 49 | 3.31 | 90.5 |
| 20–30 | 49 | 3.33 | 89.0 |
| 30–50 | 35 | 3.16 | 90.5 |
| 50–70 | 49 | 3.33 | 88.5 |

Example 6

A laminated film used as an ion exchange layer was prepared by heat press-bonding a $CF_2=CF_2/CF_2=CFOCF_2CF_2CF_2CO_2CH_3$ copolymer film having a thickness of 140 μm and an ion exchange capacity of 1.44 meq/g dry resin with a $CF_2=CF_2/CF_2=CFOCF_2CF_2CF_2CO_2CH_3/CF_2=CFOC_2F_4CF_3$ copolymer film having a thickness of 20 μm and an ion exchange capacity of 0.76 meq/g dry resin (a molar ratio of $CF_2=CFOCF_2CF_2CF_2CO_2CH_3/CF_2=CFOC_2F_4CF_3$:62/38).

On the other hand, two types of films having a thickness of 20 μm respectively, and a thickness of 10 μm were prepared from a $CF_2=CF_2/CF_2=CFOCF_2CF_2CF_2CO_2CH_3$ copolymer having an ion exchange capacity of 1.68 meq/g dry resin. The above prepared film of the 20 μm thickness was sandwiched with two sheets of the $ZrO_2$ porous layers as prepared in Example 1 but containing $ZrO_2$ particles in an amount of 4 mg/cm$^2$, and the sandwiched structure was heat press-bonded to obtain a porous layer A. Also, the above prepared film of the 10 μm thickness was sandwiched with two sheets of the same type of $ZrO_2$ porous layers but containing $ZrO_2$ particles in an amount of 2 mg/cm$^2$, and the sandwiched structure was heat press-bonded to obtain a porous layer B. The above prepared porous layer A was laminated on the copolymer layer having the ion exchange capacity of 0.76 meq/g dry resin side of the above prepared multi-layered ion exchange membrane, and the above prepared porous layer B was then laminated on the porous layer A. Thereafter, the same type of gas-releasing layer comprising $ZrO_2$ particles as used in Example 2, was provided on both sides of the above prepared laminated structure by heat press-bonding, and the resultant structure was subjected to hydrolysis with an NaOH aqueous solution having a concentration of 25% by weight at 70° C. for 16 hours.

The above prepared porous layers A and B were separately subjected to hydrolysis to measure its porosity and water-permeability, and it was found that the porous layer A had a porosity of 23% and a water-permeability of 18 cc/hr·cm$^2$·atom and that the porous layer B had a porosity of 13% and a water-permeability of 0.5 cc/hr·cm$^2$·atom.

The fluorine-containing ion exchange membrane thus obtained was placed in an electrolytic cell so as to have the porous layers A and B faced to the cathode side, and electrolysis was carried out by supplying an NaCl aqueous solution containing 0.3 ppm of Ca ion while keeping the concentration of sodium hydroxide at 35% by weight. As this result, a current efficiency of 95.3% was achieved, and the current efficiency was not lowered during continuously electrolyzing for 120 days.

Comparative Example 6

A comparative ion exchange membrane was prepared in the same manner as in Example 6, except that the porous layers A and B were omitted, and electrolysis was carried out also in the same manner as in Example 6 by using the above prepared comparative ion exchange membrane. As this result, a current efficiency was low, i.e. 90% from the first stage, and was further lowered to 82% during operating for 5 days.

Comparative Example 7

A comparative ion exchange membrane was prepared by providing a gas-releasing layer comprising the $ZrO_2$ porous layer as used in Comparative Example 6 on both sides of the laminated ion exchange layer having no porous layers A and B as used in Example 1, and electrolysis was carried out by using the above prepared comparative ion exchange membrane in the same manner as in Example 6. As the result, a current efficiency was initially 96%, but it was lowered to 89% during electrolyzing for 5 days.

Example 7

A multi-layered ion exchange membrane was prepared in the same manner as in Example 5, except that a porous layer prepared by casting a dispersion of 25% of SiC of 5.5 μm average particle size in a 7.0% ethanol solution of an acid type polymer of $CF_2=CF_2/CF_2=CFOCF_2CF(CF_3)OCF_2CF_2SO_2F$ on the porous layer A to bond SiC particles with the above polymer as a binder, was used as a porous layer A. Electrolysis was carried out by using the above prepared ion exchange membrane, and as a result, the concentration of sodium hydroxide in the cathode compartment was 51% at a current efficiency of 95.3% and a voltage of 3.32 V.

The above porous layer A was separately prepared to measure a porosity and a water-permeability, and it was found that the porosity was 43% and that the permeability was 17 cc/hr·cm$^2$·atom.

The cation exchange membrane of the present invention, which has a multi-layer structure comprising the first and the second ion exchange layers and the specific asymmetric porous layer, enables the stable electrolysis for producing an alkali hydroxide having a concentration in a wide range of from 20 to 54% by weight for a long time without causing the peeling off between layers while keeping satisfactory current efficiency and electrolysis voltage, and allows the use of a large amount of impurities including heavy metal ions such as calcium in the starting alkali metal chloride aqueous solution.

We claim:

1. A fluorine-containing cation exchange membrane for electrolysis, which comprises a multi-layered structure prepared by integrally laminating (i) the first ion exchange layer having —COOM groups, wherein —M is hydrogen or an alkali metal, in an ion exchange capacity of from 0.6 to 2.0 meq/g dry resin and having a thickness of from 5 to 300 μm, (ii) the second ion exchange layer present on an anode side of the first ion exchange layer, the second ion exchange layer having a smaller specific resistance and a larger thickness than the first ion exchange layer, and (iii) a hydrophilic asymmetric porous layer present on a cathode side of the first ion exchange layer, the porous layer having a water-permeability which becomes smaller in proportion as being closer to the cathode.

2. The membrane according to claim 1, wherein the asymmetric porous layer comprises inorganic particles and a fluorine-containing polymer having hydrophilic groups.

3. The membrane according to claim 2, wherein the fluorine-containing polymer having hydrophilic groups has —SO$_3$M groups M is as defined in claim 1 or —COOM groups in an ion exchange capacity of from 0.5 to 2.0 meq/g dry resin.

4. The membrane according to claim 1, wherein the asymmetric porous layer comprises an anode side porous layer having a larger water-permeability and a cathode side porous layer having a smaller water-permeability.

5. The membrane according to claim 4, wherein the anode side porous layer has a water-permeability of from $1 \times 10^{-2}$ to $5 \times 10^2$ cc/hr·cm$^2$·atom and the cathode side porous layer has a water-permeability of from $1 \times 10^{-3}$ to 5 cc/hr·cm$^2$·atom.

6. The membrane according to claim 1, wherein a gas releasing layer comprising inorganic particles is bonded to at least one of the anode side and the cathode side of the membrane.

7. A process for producing an alkali metal hydroxide, which comprises supplying an alkali metal chloride aqueous solution to an anode compartment of an electrolytic cell partitioned by the membrane as defined in claim 1 into the anode compartment and a cathode compartment, and electrolyzing it to produce the alkali metal hydroxide in the cathode compartment.

8. The process according to claim 7, wherein the alkali metal hydroxide has a concentration of from 20 to 54% by weight.

9. An electrolytic cell partitioned by the membrane as defined in claim 1 into an anode compartment and a cathode compartment.

* * * * *